US010803595B2

(12) United States Patent
Schulte et al.

(10) Patent No.: US 10,803,595 B2
(45) Date of Patent: Oct. 13, 2020

(54) THERMAL-IMAGE BASED OBJECT DETECTION AND HEAT MAP GENERATION SYSTEMS AND METHODS

(71) Applicant: FLIR Systems Trading Belgium BVBA, Meer (BE)

(72) Inventors: Stefan Schulte, Marke (BE); Steffen De Muynck, Wavelgem (BE)

(73) Assignee: FLIR Systems Trading Belgium BVBA, Meer (BE)

( * ) Notice: Subject to any disclaimer, the term of this patent is extended or adjusted under 35 U.S.C. 154(b) by 156 days.

(21) Appl. No.: 16/014,112

(22) Filed: Jun. 21, 2018

(65) Prior Publication Data
US 2018/0300884 A1    Oct. 18, 2018

Related U.S. Application Data

(63) Continuation of application No. PCT/US2017/012397, filed on Jan. 5, 2017.

(60) Provisional application No. 62/276,766, filed on Jan. 8, 2016.

(51) Int. Cl.
*G06T 7/00* (2017.01)
*G06T 7/194* (2017.01)
*G06K 9/32* (2006.01)
*G06K 9/00* (2006.01)
*G06T 5/50* (2006.01)

(52) U.S. Cl.
CPC .......... *G06T 7/194* (2017.01); *G06K 9/00624* (2013.01); *G06K 9/3241* (2013.01); *G06T 5/50* (2013.01); *G06T 2207/10048* (2013.01); *G06T 2207/30196* (2013.01)

(58) Field of Classification Search
None
See application file for complete search history.

(56) References Cited

U.S. PATENT DOCUMENTS

| 4,298,887 | A  | 11/1981 | Rode          |
|-----------|----|---------|---------------|
| 5,960,111 | A  | 9/1999  | Chen et al.   |
| 6,028,309 | A  | 2/2000  | Parrish et al.|
| 6,658,136 | B1 | 12/2003 | Brumitt       |
| 6,909,806 | B2 | 6/2005  | Li            |
| 6,912,313 | B2 | 6/2005  | Li            |
| 7,916,944 | B2 | 3/2011  | Yang et al.   |
| 7,995,859 | B2 | 8/2011  | Högasten      |
| 8,159,536 | B2 | 4/2012  | Wang et al.   |

(Continued)

*Primary Examiner* — Delomia L Gilliard
(74) *Attorney, Agent, or Firm* — Haynes and Boone, LLP (57) ABSTRACT

An infrared (IR) imaging module may capture a background image in response to receiving IR radiation from a background of a scene and determine background calibration terms using the background image. The determined background calibration terms may be scale factors and/or offsets that equalize the pixel values of the background image to a baseline, value. IR imaging device may use the background calibration terms to capture images that have the baseline value for pixels corresponding to IR radiation received from the background and higher values (or lower values) for pixels corresponding to IR radiation received from a foreground. Such images may be used to count people and generate a heat map. The background calibration terms may be updated periodically, with the update period being increased at least for some pixels or a pixel area when a person is detected.

16 Claims, 8 Drawing Sheets

(56) References Cited

U.S. PATENT DOCUMENTS

| | | | |
|---|---|---|---|
| 8,208,755 B1 | 6/2012 | Hogasten | |
| 8,265,349 B2 | 9/2012 | Wang et al. | |
| 8,285,046 B2 | 10/2012 | Cobb et al. | |
| 8,330,820 B2 | 12/2012 | Liberman et al. | |
| 8,503,821 B2 | 8/2013 | Hogasten | |
| 8,712,149 B2 | 4/2014 | Pai et al. | |
| 2002/0084414 A1* | 7/2002 | Baker | G01S 3/7864 250/336.1 |
| 2010/0182433 A1* | 7/2010 | Shimbo | G06K 9/00771 348/153 |
| 2010/0298931 A1* | 11/2010 | Quadri | A61F 2/2418 623/2.11 |
| 2011/0199489 A1* | 8/2011 | Fischer | H04N 5/33 348/164 |

* cited by examiner

FIG. 8

THERMAL-IMAGE BASED OBJECT DETECTION AND HEAT MAP GENERATION SYSTEMS AND METHODS

CROSS-REFERENCE TO RELATED APPLICATIONS

This application is a continuation of International Patent Application No. PCT/US2017/012397 filed Jan. 5, 2017 and entitled "THERMAL-IMAGE BASED OBJECT DETECTION AND HEAT MAP GENERATION SYSTEMS AND METHODS," which is incorporated herein by reference in its entirety.

International Patent Application No. PCT/US2017/012397 filed Jan. 5, 2017 claims priority to and the benefit of U.S. Provisional Patent Application No. 62/276,766 filed Jan. 8, 2016 and entitled "THERMAL-IMAGE BASED OBJECT DETECTION AND HEAT MAP GENERATION SYSTEMS AND METHODS," which is hereby incorporated by reference in its entirety.

TECHNICAL FIELD

One or more embodiments of the present invention relate generally to thermal imaging and more particularly, for example, to systems and methods for object detection and heat map generation based on thermal images.

BACKGROUND

Focal plane arrays (FPAs) that detect infrared (IR) radiation, such as thermal IR radiation, are used by IR imaging devices (e.g., IR cameras) to provide thermal images. For example, thermal radiation passing through an optical path of an IR imaging device is received by IR detectors of the FPA, which provide image data for pixels of thermal images.

Images may be processed to detect objects (e.g., count people) and/or generate a heat map. One method for object detection in an image may include performing background-foreground segmentation on an image captured by and received from an imaging device. However, background-foreground segmentation processes typically require use of a significant amount of the processing power of a processor (e.g., up to 50% of the processing power of a typical central processing unit (CPU) used with imaging devices).

IR imaging devices typically require a mechanical shutter. Mechanical components such as mechanical shutters are more prone to wear and tear, and thus adversely affect the overall reliability and longevity of IR imaging devices that rely on mechanical shutters. Further, IR imaging devices that are used in surveillance or security cameras typically require automatic mechanical shutters, which include numerous mechanical components such as a shutter blade (e.g., a shutter paddle), an actuator (e.g., a motor), and an associated drive train to move the shutter blade in and out of the optical path. Also, mechanical shutters, if integrated into or otherwise provided in an IR imaging device, may increase the size, complexity, and cost of IR imaging devices.

SUMMARY

Systems, devices, and methods for heat map and people counting are provided. In one or more embodiments, device includes an infrared (IR) imaging module configured to capture thermal images; a memory configured to store background calibration terms; and a logic device configured to receive a thermal image of a background from the IR imaging module, determine the background calibration terms based on the thermal image of the background, and apply the background calibration terms. The background calibration terms bring each pixel value of the thermal image of the background to a baseline pixel value, and the IR imaging module is configured to provide a thermal image of a scene including the baseline pixel value for pixels corresponding to the background and pixel values different from the baseline pixel value for pixels corresponding to a foreground according to the applied background calibration terms.

In some embodiments, the logic device is further configured to receive additional thermal images of the background from the IR imaging module, and update the background calibration terms periodically according to a time interval based on the additional thermal images. In some embodiments, the device further includes a processor configured to determine foreground pixels in the thermal image of the scene, determine segments based on the foreground pixels, detect one or more objects of interest indicated by at least one of the segments, and, in response to detecting the one or more objects of interest, increase the time interval.

In some embodiments, the processor is configured to update the background calibration terms in response to detecting no objects of interest during the time interval. In some embodiments, the increased time interval is applied only to select pixels that are a part of the at least one of the segments, and the processor is configured to update the background calibration terms corresponding to the select pixels according to the increased time interval.

In some embodiments, the one or more objects of interest comprise one or more people. For example, the processor may be configured to detect the one or more people based on a volume of the at least one of the segments, an average pixel intensity, or both. In another example, the processor may be configured to detect the one or more people based on a volume, contours, an aspect ratio, and/or a histogram of oriented gradients of the at least one of the segments. In some embodiments, the processor is further configured to generate a heat map indicating where the one or more people are located, walking to, and/or looking at based on the thermal image of the scene.

In some embodiments, the logic device is configured to apply the background calibration terms to a readout integrated circuit of the IR imaging module, to the thermal image of the scene, or both. In some embodiments, the background calibration terms comprise gain terms and/or offset terms. In some embodiments, the IR imaging module is a 14-bit shutterless IR imaging module configured to capture 14-bit thermal images.

In one or more embodiments, a method includes capturing a thermal image of a background, acquiring background calibration terms based on the thermal image of the background, applying the background calibration terms, and capturing a thermal image of a scene. The background calibration terms bring each pixel value of the thermal image of the background to a baseline pixel value, and the thermal image of the scene includes the baseline pixel value for pixels corresponding to the background and pixel values different from the baseline pixel value for pixels corresponding to a foreground.

In some embodiments, the method further includes capturing additional thermal images of the background, and updating the background calibration terms applied to the IR imaging module periodically according to a time interval based on the additional thermal images. In some embodiments, the method further includes determining foreground pixels in the thermal image of the scene, determining segments based on the foreground pixels, detecting one or more objects of interest indicated by at least one of the segments, and, in response to the detecting, increasing the time interval.

In some embodiments, the updating is in response to detecting no objects of interest during the time interval. In some embodiments, the increasing of the time interval is applied only to select pixels that are a part of the at least one of the segments, and wherein the updating comprises updating the background calibration terms corresponding to the select pixels according to the increased time interval.

In some embodiments, the one or more objects of interest comprise one or more people. For example, the detecting of the one or more people may be based on a volume of the at least one of the segments, an average pixel intensity, or both. In another example, the detecting of the one or more people may be based on a volume, contours, an aspect ratio, and/or a histogram of oriented gradients of the at least one of the segments. In some embodiments, the method further includes generating a heat map indicating where the one or more people are located, walking to, and/or looking at based on the thermal image of the scene.

In some embodiments, the applying comprises applying the background calibration terms to a readout integrated circuit, to the thermal image of the scene, or both. In some embodiments, the applying comprises applying gain terms and/or offset terms. In some embodiments, the thermal image of the background and the thermal image of the scene are 14-bit thermal images.

The scope of the invention is defined by the claims. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Systems, devices, and methods for heat map and people counting are provided. An infrared (IR) imaging device may capture a background image in response to IR radiation from a background. The IR imaging device may perform aspects of processes used for non-uniformity correction (NUC), such as a flat-field correction (FFC) process, to determine the calibration terms. However, instead of using an image of a shutter that is used for an FFC process, the IR imaging device determines calibration terms using the background image. IR imaging device may use the background calibration terms to capture images that have the baseline pixel value for pixels corresponding to IR radiation received from the background and higher pixel values for pixels corresponding to IR radiation received from a foreground. The images captured by the IR imaging device may be used to count people and generate a heat map.

IR imaging devices may include a focal plane array (FPA) that detects IR radiation from a scene. The individual IR detectors of the FPA may not respond uniformly to an incident IR radiation. Factors contributing to such non-uniformity may include, for example, variations in the physical characteristics (i.e., dimensions and locations), IR radiation absorption coefficient, resistance, temperature coefficient of resistance (TCR), heat capacity, and/or thermal conductivity of the individual IR detectors. Further non-uniform out-of-field IR radiation from surrounding mechanical components may contribute to the non-uniformity. In order to compensate for the non-uniformities and obtain a desirable signal-to-noise ratio, NUC techniques are used to calibrate the FPA such that each IR detector provides a consistent pixel value in response to IR radiation of the same intensity level.

An FFC process may be used to perform the NUC. The FFC process may include selectively inserting a shutter into an optical path of the FPA, and calibrating IR detectors of an FPA based on IR radiation from the shutter. The shutter blocks the IR radiation from the scene and provides a uniform temperature source, which may approximate a thermal black body and thereby provide a flat-field source of IR radiation. The shutter emits uniform IR radiation to each IR detector of the FPA, and in response to the IR detectors receiving the uniform IR radiation, an IR imaging device captures an image of the shutter and processes the image to acquire FFC terms (e.g., FFC values or an FFC map). The IR imaging device may use the FFC terms to achieve a desirable signal-to-noise ratio for images taken after the FFC process. After calibration of the FPA based on the uniform IR radiation from the shutter, the IR imaging device may capture images of a scene in which non-uniformities are compensated for by application of the FC terms.

In an example, the IR imaging device may apply the FFC terms, such as gain and/or offset terms for each pixel corresponding to a respective IR detector, to a component of the IR imaging device such as a readout integrated circuit (ROIC) and/or an input image. By applying the FFC terms, in response to the FPA receiving IR radiation from the scene, the IR imaging device may provide an output image that compensates for non-uniformities. In another example, the FFC terms may be stored as a NUC image. The IR imaging device may capture an input image in response to IR radiation from the scene, and a logic device may subtract the NUC image from the raw image to generate an output image that compensates for non-uniformities. Accordingly, the FPA may take one or more data frames (e.g., one or more snapshots) of the shutter to calibrate its response to provide a more uniform response for IR radiation of the same intensity level.

Figure 1:
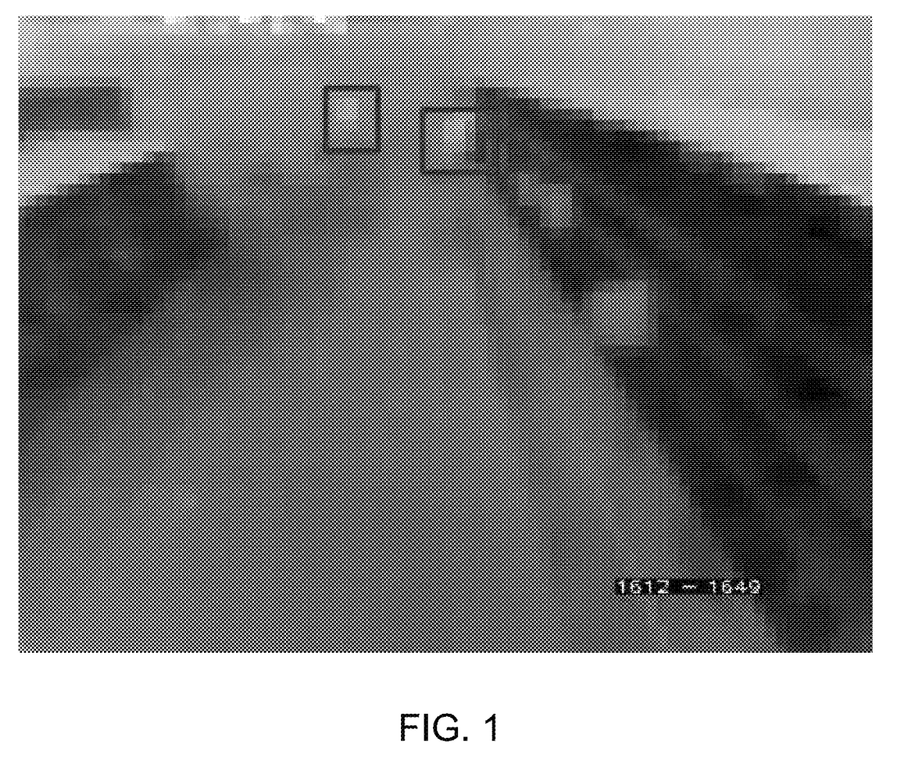
FIG. 1 illustrates an example thermal image of a scene captured by an infrared (IR) imaging device that has been calibrated by performing flat-field correction (FFC) with a shutter.

An IR imaging device that use an FFC process with a shutter as described above may capture images to count objects and generate heat maps. A process for heat map generation and object detection may include performing FFC with the shutter, capturing an image of a background, generating a background model using the image of the background, and performing background/foreground segmentation based on the background model. After the background model is generated, an image of a scene is captured using the IR imaging device and processed using the background model to identify pixels that potentially correspond to foreground objects. After further processing of the identified pixels, objects may be detected and indicated in the captured image of the scene. FIG. 1 illustrates an example thermal image captured by an IR imaging device that uses a shutter to perform FFC, in which object detection process has been performed to detect objects indicated by rectangles.

The FFC process as described above may be performed, rather than using a shutter, using instead an image of an empty scene in accordance with one or more embodiments of the disclosure. An IR imaging device may perform a calibration process (corresponding to the FFC process described above) without a shutter using an image of a scene that only includes a background. The background contains varying temperature sources, so it does not provide a uniform temperature source. In response to the IR detectors receiving varying IR radiation from the background, the IR imaging device captures a background image and processes the background image to acquire background calibration terms (e.g., background calibration values or a background calibration map). Applying the background calibration terms reduce each the pixel value of the background image, which corresponds to IR radiation received from the background, to a baseline pixel value (e.g., zero). Accordingly, the background calibration terms are such that they flatten out the variation of IR radiation levels.

Figure 2:
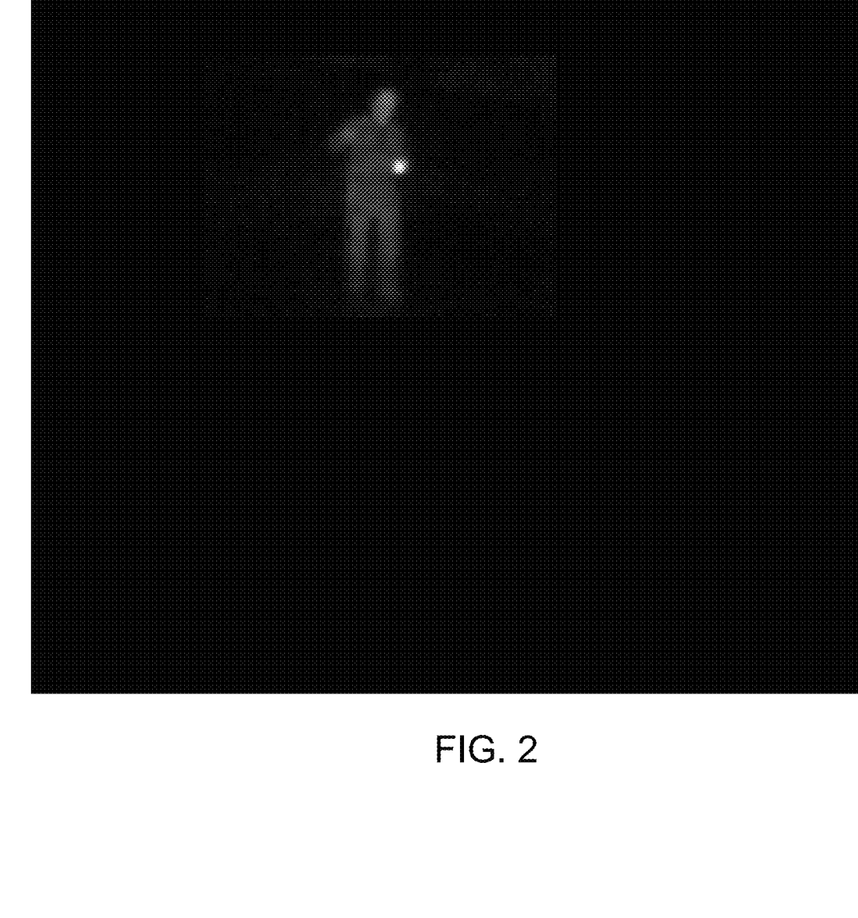
FIG. 2 illustrates an example thermal image of a scene captured by an IR imaging device that has been calibrated using a background.

The IR imaging device may calibrate the FPA based on IR radiation from the background. When IR imaging device captures images of a scene including the background and a foreground (e.g., an object or a person), the output image will have no or little scene-background information and provide scene-foreground information. Pixels of the output image corresponding to IR radiation received from the background will have values that are at or close to the baseline pixel value (e.g., zero). All the scene-background information is removed due to the application of the background calibration terms. On the other hand, pixels of the output image corresponding to IR radiation received from the foreground will have higher or lower pixel values than the baseline pixel value. Accordingly, the IR imaging device that has been calibrated using the background image may provide output images that directly show the foreground or show the foreground with far less processing compared to IR imaging device that perform background-foreground segmentation techniques on images captured using an FFC process with a shutter. FIG. 2 illustrates an example thermal image of a scene including a background and a person in the foreground captured by an IR imaging device that has been calibrated using an image of the background (i.e., the scene without the person) according to one or more embodiments of the disclosure.

In some embodiments, an IR imaging device may apply the background calibration terms, such as gain and/or offset terms for each pixel corresponding to a respective IR detector, to a component of the IR imaging device such as an ROIC and/or an input image. Each of the IR detectors of FPA may provide a consistent pixel value (e.g., a low pixel value such as zero, or other baseline or reference value) in response to corresponding IR radiation received from the background. By applying the background calibration terms, the IR imaging device generates an output image that show little or no background and show the foreground objects with high pixel intensity. The IR imaging device may further update previously acquired background calibration terms.

In other embodiments, an IR imaging device may store the background calibration terms as a background calibration image. The IR imaging device may capture an input image in response to IR radiation from the scene, and a logic device may subtract the background calibration image from the input image. By subtracting the background calibration image, the IR imaging device generates an output image that show little or no background and show the foreground objects with high pixel intensity. The IR imaging device may further update a previously stored background calibration image.

A processor that receives the example thermal image of FIG. 2 output by an IR imaging module calibrated using an image of the background is able to detect foreground objects by simply determining where the high pixel values are located in the image. In contrast, a processor that receives the example thermal image of FIG. 1 output by an IR imaging module calibrated using a shutter must perform significantly more processing (e.g., using complex algorithms) to detect foreground objects.

Figure 3:
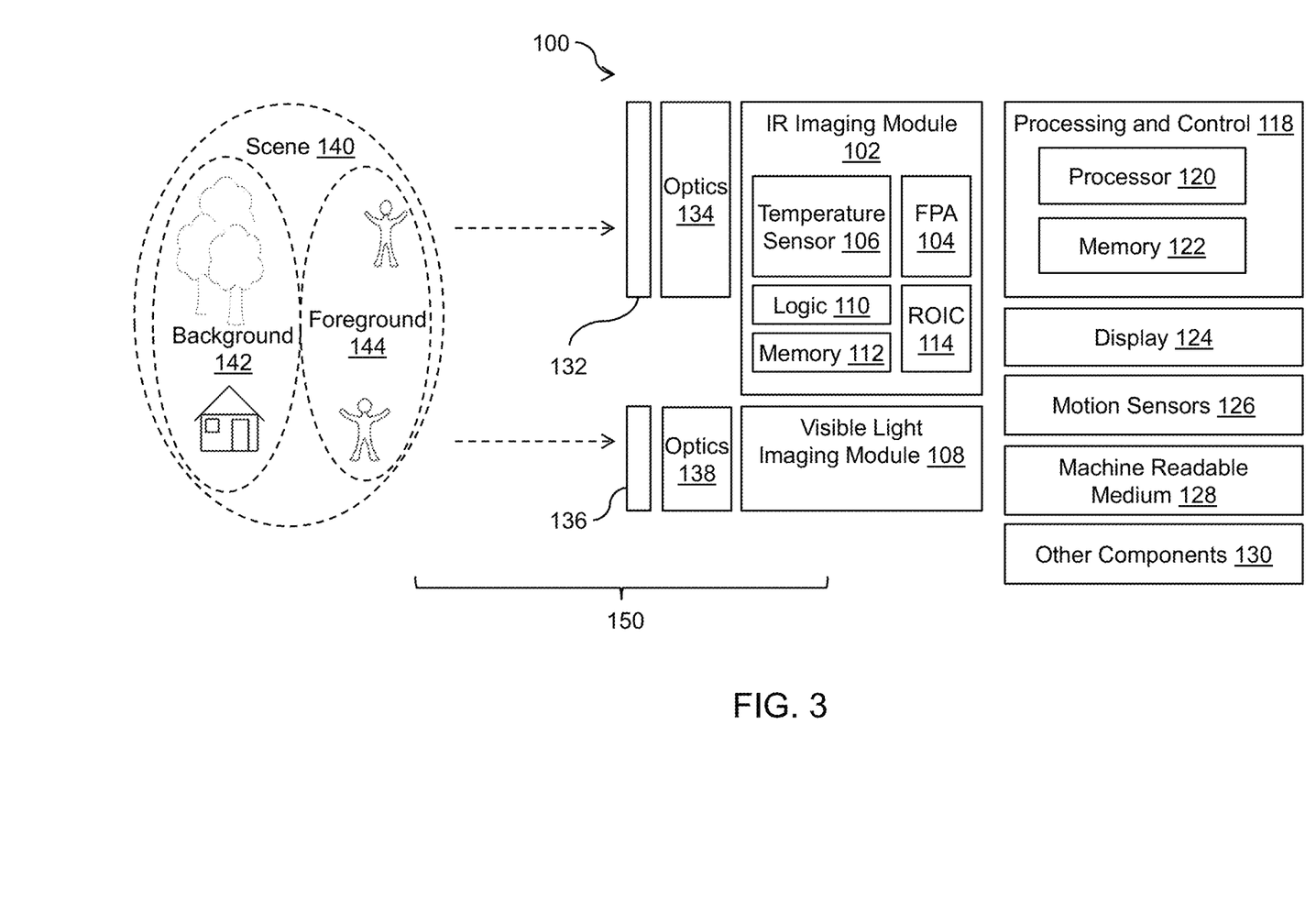
FIG. 3 illustrates an exemplary IR imaging device in accordance with an embodiment of the disclosure.

FIG. 3 illustrates a block diagram of an IR imaging device 100 in accordance with an embodiment of the invention. IR imaging device 100 includes an IR imaging module 102 with a focal plane array (FPA) 104 configured to detect IR radiation and provide IR image data (e.g., thermal image data). IR imaging module 102 may also be coupled to or include a temperature sensor 106 configured to detect a temperature of FPA 104. IR imaging device 100 may also include a visible light module 108.

IR imaging module 102 may include or be coupled to a logic device 110 and/or a non-volatile memory 112. Logic device 110 may include programmable logic devices (PLDs), microcontrollers, application specific integrated circuits (ASICs), and/or other logic devices. Logic device 110 may be configured to perform processes specific to or associated with IR imaging module 102 as further described herein, and may store and access data in non-volatile memory 112. IR imaging module 102 may also include or be coupled to an integrated circuit such as an ROIC 114.

IR imaging device 100 may also include a processing and control block 118 including a processor 120 and a memory 122, a display 124, one or more motion sensors 126, a machine readable medium 128, and/or other components 130. IR imaging device 100 may further include a window 132 and/or one or more optics blocks 134 for IR imaging module 102 and a window 136 and/or one or more optics blocks 138 for visible light imaging module 108.

IR imaging device 100 may represent any type of IR camera or thermal imaging system not limited to any specific embodiment disclosed herein, and may be implemented as desired for particular applications. In this regard, the components illustrated in FIG. 3 may be implemented as a standalone IR camera in one embodiment, while in another embodiment the components of FIG. 3 may be distributed among a plurality of different devices. Thus, in one example, all or part of processing and control block 118 may be implemented by one or more external computer systems that interface with IR imaging device 100 (e.g., over a network or other appropriate communication medium). In another example, all or part of processing and control block 118 may be implemented in a host device such as a smart phone or other mobile device, with other components of FIG. 3 being implemented in a device attachment configured to be attached to the host device, for example, according to one or more aspects disclosed in U.S. patent application Ser. No. 13/901,428, filed May 23, 2013, and entitled "Device Attachment with Infrared imaging Sensor," and International Patent Application No. PCT/US2013/062433, filed Sep. 27, 2013, and entitled "Device Attachment with Infrared imaging Sensor," all of which are incorporated herein by reference in their entirety. In some embodiments, IR imaging device 100 may be implemented with greater, fewer, and/or different components than those illustrated in FIG. 3 as appropriate for particular applications.

FPA 104 of IR imaging module 102 may be configured to detect IR radiation from a scene 140 for a field of view (FOV) of FPA 104, and provide IR image data (e.g., via analog or digital signals) representing the IR radiation in response to detecting the IR radiation. FPA 104 may be implemented using any suitable type of IR detectors (e.g., quantum wells, microbolometers, thermopiles, or other types of detector elements responsive to IR radiation) that are arranged in a suitable pattern (e.g., a rectangular array, a square array, a one-dimensional array, or other arrangements) as may be desired for particular implementations. ROIC 114, which may be coupled to or integrated with FPA 104, is configured to generate analog or digital signals corresponding to the intensity of IR radiation received at each IR detector of FPA 104 and to interface with other components such as processing and control block 118. Further examples of ROICs 114 and IR detectors (e.g., microbolometer circuits) of FPA 104 may be found in U.S. patent application Ser. No. 09/021,714, filed Feb. 10, 1998, and entitled "Methods and Circuitry for Correcting Temperature-Induced Errors in Microbolometer Focal Plane Array," now U.S. Pat. No. 6,028,309, issued Feb. 22, 2000, which is incorporated herein by reference in its entirety.

IR imaging module 102 may capture IR image data (e.g., a thermal image) using FPA 104. In the illustrated embodiment of FIG. 3, IR radiation from scene 140 passes along an optical path 150 through window 132 and one or more optics blocks 134 to reach IR imaging module 102 (e.g., a vacuum package assembly). Optics block 134 may be implemented, for example, with athermalized optics including one or more lenses (e.g., lens elements), and configured to focus the IR radiation onto FPA 104 provided in IR imaging module 102. In one example, IR imaging module 102 and optics block 134 may be sealed inside a chamber including window 132 (e.g., a heated or temperature controlled protective window) positioned between optics block 134 and scene 140. In another example, one or more lenses of optics block 134 may be selectively inserted into optical path 150. Accordingly, IR imaging device 100 may be operated with various lenses (e.g., 25 mm, 35 mm, 50 mm, 140 mm, or other size) as may be desired for particular applications. The different types of lenses may contribute to different non-uniformities in the propagation of IR radiation along optical path 150. Although window 132 and optics block 134 are shown in the embodiment of FIG. 3, window 132, optics block 134, or both may be omitted, or combined with IR imaging module 102, according to various other embodiments.

IR imaging device 100 may include visible light imaging module 108 that is configured to capture visible light image data (e.g., a visible light image). In the illustrated embodiment of FIG. 3, visible light from scene 140 may pass along optical path 150 through window 136 and one or more optics blocks 138 to reach visible light imaging module 108. Window 136 (e.g., a protective window) may be positioned between optics block 138 and visible light imaging module 108. Although window 136 and optics block 138 are shown in the embodiment of FIG. 3, window 136, optics block 138, or both may be omitted, or combined with visible light imaging module 108, according to various other embodiments.

In IR imaging devices that use a shutter to perform FFC, a logic device may receive thermal image data captured by IR detectors of an FPA while the shutter is closed, and processes the thermal image data to perform FFC to compensate for non-uniformities (e.g., different gains and dark currents) associated with the IR detectors of the FPA and other non-uniformities associated with optics blocks or other portions of the IR imaging device. The shutter emits uniform IR radiation to each IR detector of the FPA such that pixel values corresponding to each IR detector may be compared. The logic device may thereby acquire FFC terms (e.g., gain and/or offset terms) that may be used. The FFC terms may be applied to an IR imaging module (e.g., a ROIC of the IR imaging module) and/or an input image to provide corrected thermal images of a scene that account for non-uniformities of the FPA. When the IR imaging module captures an image subsequent to the acquisition of the FFC terms, uniform IR radiation throughout the FOV will create a uniform output image. The determination of FFC terms are further described as an example in U.S. patent application Ser. No. 12/391,156, filed Feb. 23, 2009, and entitled "Flat field correction for IR cameras," now U.S. Pat. No. 8,373,757 entitled "Flat field correction for IR cameras," issued Feb. 12, 2013, which is incorporated herein by reference in its entirety.

IR imaging module 102 may capture an image of an empty scene, rather than the image of the shutter as described above, and the image of the empty scene may be used to acquire calibration terms in accordance with one or more embodiments of the disclosure. A scene 140 may include a background 142 and a foreground 144. The empty scene refers to background 142. Foreground 144 may include objects such as people. The objects in foreground 144 may be moving objects and/or objects that have moved into scene 140 since IR imaging device 100 acquired or updated background calibration terms using the image of background 142.

FPA 104 may detect IR radiation received from scene 140 that only includes background 142 along optical path 150 for a FOV. In response, ROIC 114 may generate thermal image data (e.g., a thermal image) of background 142. Logic device 110 may receive the thermal image data from ROIC 114, and acquire background calibration terms (e.g., background calibration values or a calibration map) by processing the thermal image data to determine background calibration terms. The background calibration terms may be acquired using the FFC process described above but without the shutter. As the FFC process is being performed using the thermal image data of background 142 instead of thermal image data from a shutter, pixel values corresponding to IR radiation received from background 142 will be calibrated (e.g., by gain and offset) to a baseline pixel value (e.g., zero).

Logic device 110 may apply the background calibration terms such that when IR imaging module 102 captures an image of background 142 subsequent to the application of background calibration terms, each pixels value of the image of background 142 is calibrated to be equal or approximately equal in value (e.g., each pixel value is or close to zero or some other baseline pixel value). Logic device 110 may apply the background calibration terms to ROIC 114 such that image data generated by ROIC 114 in response to FPA 104 receiving IR radiation is calibrated to background 142. For example, IR imaging module 102 may capture an input image by ROIC 114 generating the input image in response to FPA 104 receiving IR radiation, and ROIC 114 or logic device 110 may send the input image to processor 120 as an output image. Additionally, or alternatively, logic device 110 may apply the background calibration terms to the input image to generate output image to be sent to processor 120. For example, IR imaging module 102 may capture an input image by ROIC 114 generating the input image in response to FPA 104 receiving IR radiation, and logic device 110 may apply background calibration terms to the input image to generate an output image, which may be sent to processor 120.

When IR imaging module 102 captures an image of scene 140 including background 142 and foreground 144, the output image may have high pixel values for pixels corresponding to IR radiation received from foreground 144 (e.g., representing objects that are hotter than background 144), and pixel values at or close to the baseline pixel value (e.g., zero or low pixel values below a predetermined threshold) for pixels corresponding to IR radiation received from background 142, for example. Accordingly, the image may be referred to as a foreground image since the foreground pixels have high pixel values and all the background pixels have pixel values at or close to the baseline pixel value (e.g., zero or low pixel values below a predetermined threshold). Similarly, in another example, the output image may have higher or lower pixel values for pixels corresponding to IR radiation received from foreground 144 (e.g., representing objects that are hotter or colder than background 144), and pixel values at or close to the baseline pixel value for pixels corresponding to IR radiation received from background 142.

The background calibration terms may be updated periodically to account for changes in background 142. After a time period from the last determination of the background calibration terms, IR imaging module 102 may capture one or more images of background 142, determine updated background calibration terms, and apply the updated background calibration terms as discussed above. Processor 120 may dynamically adjust a time period between each update based on foreground information (e.g., presence of people, human activity, human movement, etc.). Processor 120 may process the output image received from IR imaging module 102 to determine foreground pixels and segment objects. When people are detected in the image, processor 120 slows down background update, such as by lengthening the time period between updates, so that the people are not included as part of background 142. Further, background calibration terms for different pixels or pixel areas may be updated at different rates, for example, depending on detected objects or motion in corresponding pixels or pixel areas. Processor 120 may further process the output image received from IR imaging module 102 to generate heat maps and classify objects in foreground 144.

In some embodiments, IR imaging module 102 may be configured to provide thermal images as image data representing the IR radiation intensity for each pixel using high bit-depth digital values. In one implementation, IR imaging module 102 may provide thermal images having 14-bit values to represent IR radiation intensity for each pixel of the thermal images captured with background calibration terms applied. Such an IR imaging module may also be herein referred to as a 14-bit thermal imaging module. Furthermore, IR imaging module 102 according to one or more embodiments may be configured to provide the high bit-depth thermal images without compressing (e.g., for automatic gain control and/or to provide a suitable dynamic range for displaying on a screen) or otherwise mapping to lower bit-depth images. Thus, in such embodiments, more detailed pixel information may be provided by the high bit-depth pixels, thereby advantageously facilitating more accurate and efficient detection and classification of objects using the pixels of the thermal images provided by IR imaging module 102.

Processor 120 may include one or more processing systems configured with appropriate software (e.g., one or more computer programs for execution by processor 120) stored in memory 122 and/or on machine readable medium 128 to instruct processor 120 to perform one or more of the operations described herein. The one or more processing systems of processor 120 may include logic devices, microcontrollers, application specific integrated circuits (ASICs), programmable logic devices (PLDs), or other suitable processing systems.

Memory 122 may include one or more memory devices to store data and information, including IR imaging data (e.g., thermal imaging data), IR images (e.g., thermal images), background calibration terms, radiometric calibration terms, and/or other calibration terms. The one or more memory devices may include various types of memory including volatile and non-volatile memory devices, such as RAM (Random Access Memory), flash memory, EEPROM (Electrically-Erasable Read-Only Memory), ROM (Read Only Memory), a hard disk drive, or other suitable memory devices.

Processor 120 and memory 122 may be implemented in accordance with any desired combination of one or more processors and/or one or more memories as desired for particular implementations. In some embodiments, processor 120 is communicatively coupled to logic device 110 that is separate from processor 120. In other embodiments, logic device 110 is implemented, at least in part, by processor 120, and memory 112 is implemented, at least in part, by memory 122.

Machine-readable medium 128 may include one or more mediums including a compact disc, such as a CD-ROM, a digital video disc, a flash drive, or other suitable medium. Machine-readable medium 128 may be a non-transitory machine-readable medium storing machine-readable instructions, which may be executed by processor 120 to cause IR imaging device 100 to perform one or more processes described herein. Memory 122 and/or machine readable medium 128 may configured to store a plurality of calibration terms, such as calibration maps (e.g., calibration terms associated with coordinates of a map, the coordinates representing pixel locations on captured thermal images).

Display 124 may be used to display captured and/or processed IR images and/or other images, data, and information. Motion sensors 126 may be implemented by one or more motion detectors, accelerometers, gyroscopes, or other appropriate devices that may be used to detect movement of IR imaging device 100 and/or objects or people in foreground 144.

Motion sensors 126 may be monitored by and provide information to processing and control block 118 to detect motion. In various embodiments, motion sensors 126 may be implemented as part of IR imaging device 100 (as shown in FIG. 3), IR imaging module 102, or other devices attached to or otherwise interfaced with IR imaging device 100.

Other components 130 of IR imaging device 100 may include various components as desired for particular implementations of IR imaging device 100. In some embodiments, other components 130 may include one or more indicator lights, such as LED indicators, that are configured to turn on or off to indicate various conditions or an operating status associated with IR imaging device 100. For example, one or more indicator lights may be used to indicate the power status (e.g., on, off, ready-state, or in other power modes) of IR imaging device 100, and/or to indicate the calibration term acquisition state (e.g., whether the acquisition of calibration terms is complete or in progress). In some embodiments, one or more audible indicators (e.g., beepers or speakers) or vibrational indicators may be used in addition to or in place of the one or more indicator lights. In some embodiments, other components 130 may include a power block including a circuit board power subsystem (e.g., a power board) for IR imaging device 100. The power block may provide various power conversion operations and desired power supply voltages, power on-off switching, and/or various other operations, such as providing an interface to a battery or external power supply, as would be understood by one skilled in the art.

As IR imaging device 100 according to some embodiments includes no shutter for IR imaging module 102, IR imaging device 100 may not need motors or solenoids, which allow for miniaturization such that it is suitable for various devices, for example, compact security or surveillance cameras, hand-held thermal cameras, or goggle thermal cameras. IR imaging device 100 may have no electronic motion control, which allows IR imaging device 100 to have high reliability, power savings, and noiseless operation. IR imaging device 100 in other embodiments may include a shutter for IR imaging module 102, but capturing of an image to be used for calibration (e.g., an image of background 142) and determining of background calibration terms are still performed as discussed above without the shutter blocking the optical path from scene 140 to FPA 104 (e.g., with the shutter open).

Figure 4:
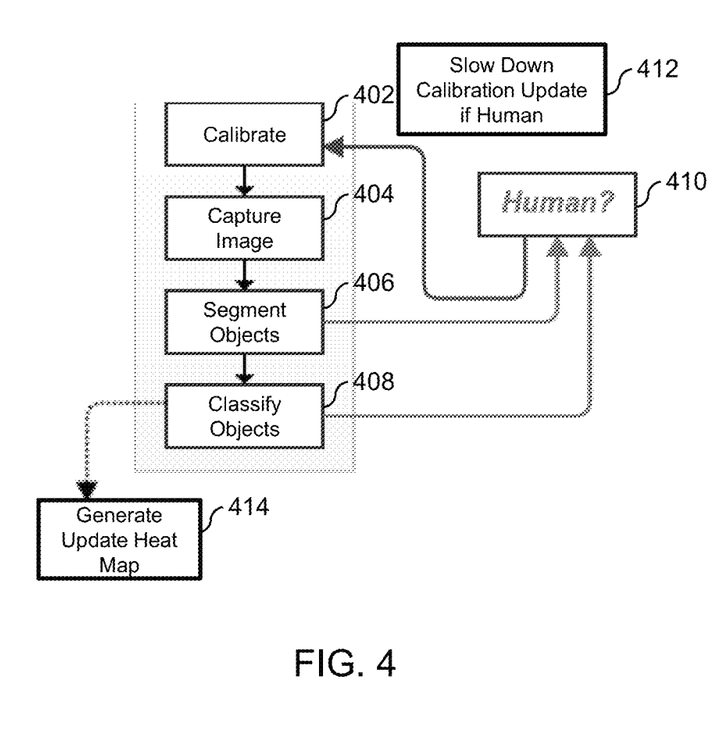
FIG. 4 illustrates a flow diagram of a process to generate a heat map and detect objects in accordance with an embodiment of the disclosure.

FIG. 4 illustrates a flow diagram of a process 400 to detect objects and generate heat maps in accordance with an embodiment of the disclosure. At block 402, background calibration terms are acquired and applied. In some embodiments, an IR imaging device such as IR imaging device 100 (shown in FIG. 3) captures and processes image data of a background such as background 142 (shown in FIG. 3) to determine background calibration terms. IR imaging module 102 (shown in FIG. 3) may generate background image data in response to FPA 104 (shown in FIG. 3) receiving IR radiation from a scene such as scene 140 (shown in FIG. 3) that only includes background 142. The background image data may include a high bit-depth input image, such as an uncompressed 14-bit input image, as discussed above for IR imaging module 102.

A logic device such as logic device 110 (shown in FIG. 3), which may be integrated with or coupled to IR imaging module 102, may process the background image data to determine background calibration terms that bring each pixel value of background image data to a baseline pixel value. The background calibration terms may include gain and offset terms for each pixel that are to be applied to values of corresponding pixels of input image data to provide the output image data.

Logic device 110 may store the background calibration terms in a non-volatile memory such as memory 112 (shown in FIG. 3), which may be integrated with or coupled to IR imaging module 102. If previously acquired background calibration terms are stored in the memory 112, the previously acquired background calibration terms are updated.

Logic device 110 may apply the background calibration terms to IR imaging module 102 (e.g., to ROIC 114). Additionally, or alternatively, logic device 110 may apply the background calibration terms to input image data (e.g., input image) when it receives the input image data from ROIC 114 at block 404, described further below. Advantageously, the application of the background calibration terms effectively eliminates the need for background models that are typically required for IR imaging devices that perform background-foreground segmentation processes on images captured using an FFC process using a shutter.

In other embodiments, the background calibration terms may be stored as background image data in a memory (e.g., memory 112, memory 122, or machine readable medium 128 shown in FIG. 3). IR imaging device 100 (e.g., using logic device 110 or processor 120 shown in FIG. 3) may subtract the background image data from the input image data for each pixel when it receives the input image data from ROIC 114 at block 404, described further below.

At block 404, IR imaging device 100 captures and handles new input image data. IR imaging module 102 may capture input image data in response to FPA 104 receiving IR radiation from scene 140. The input image data may include a high bit-depth input image, such as for example an uncompressed 14-bit input image, as discussed above for IR imaging module 102 of FIG. 3. In some embodiments, ROIC 114 of IR imaging module 102 sends input image data to processor 120 as output image data (e.g., output image). In other embodiments, logic device 110 of IR imaging module 102 may process the input image data using background calibration terms to generate output image data that is sent to processor 120. Pixels of the output image data that correspond to background 142 have pixel values at or close to a baseline pixel value (e.g., zero or close to zero) while pixels of the output image data corresponding to foreground 144 have higher or lower pixel values.

At block 406, IR imaging device 100 creates segmented objects. Processor 120 of IR imaging device 100 may perform spatial foreground detection on the output image data received from IR imaging module 102 based on the background pixels having values at or close to the baseline pixel value and the foreground pixels having a higher pixel value. For example, processor 120 may determine the foreground from the output image by determining pixel values that are above the baseline pixel value or a predetermined threshold (to eliminate pixel values that are above zero due to noise). Advantageously, the foreground is extracted simply by determining where the high pixel values are located (e.g., by applying a threshold), which effectively eliminates the need for background-foreground segmentation processes that require processing intensive and complex algorithms.

Processor 120 may segment the determined foreground to create objects. Advantageously, the foreground contains less artificial foreground pixels and object segmentation is more accurate compared to the foreground and object segmentation obtained by IR imaging devices that perform background-foreground segmentation processes on images captured using an FFC process with a shutter.

At block 408, IR imaging device 100 classifies the segmented objects (e.g., by determining whether a segmented object is or is not a human). Processor 120 of IR imaging device 100 may classify the segmented objects based on a volume of the segmented objects as each human will have a similar volume, the contours of the segmented objects, and/or the aspect ratio of the segmented objects. Further, a feature descriptor such as a histogram of oriented gradients (HoG) may be used to detect humans (e.g., using the Dalal-Triggs method).

Figure 6:
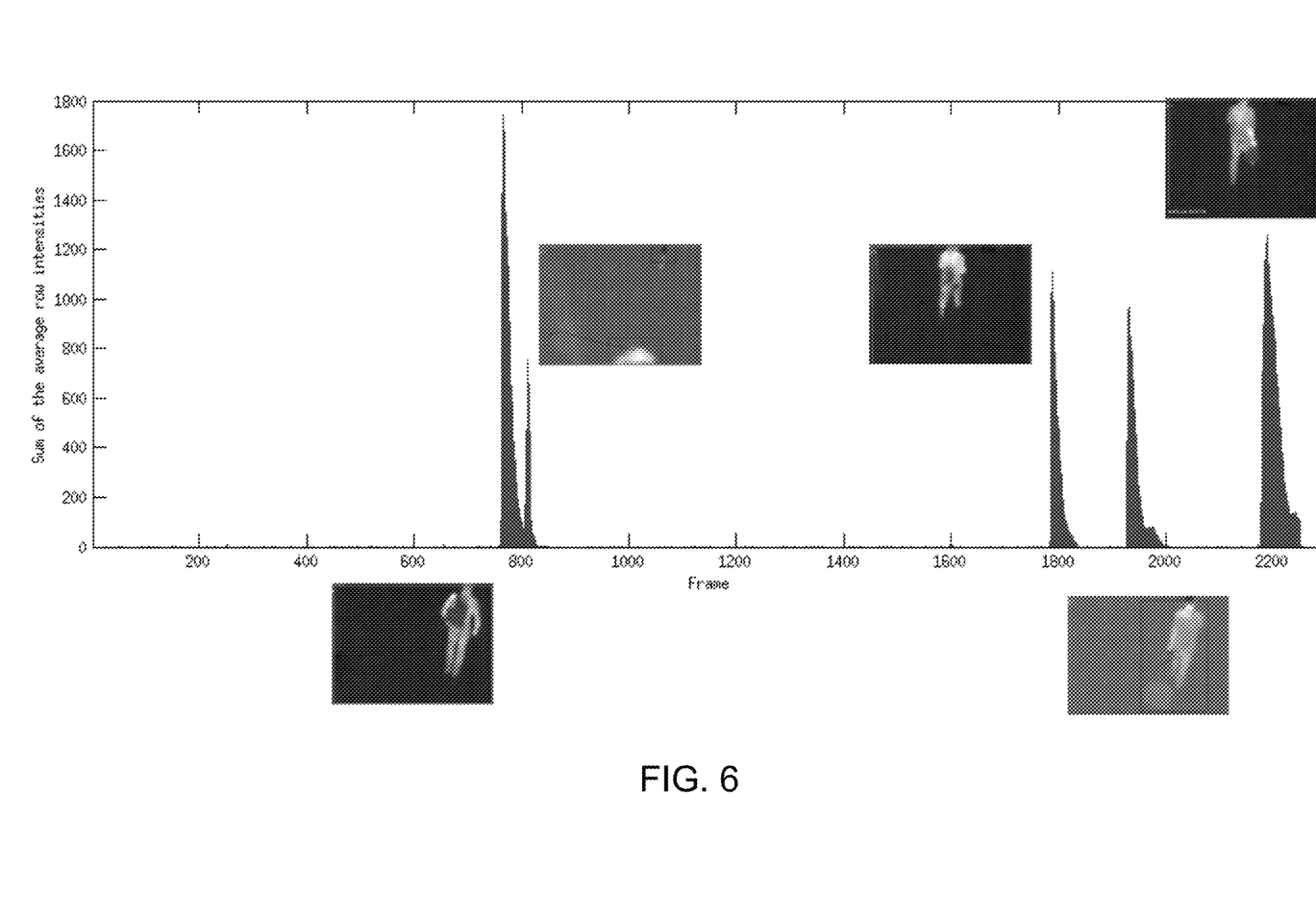
FIG. 6 illustrates images captured using a side-fired IR imaging device and a graph of average pixel intensities of the captured images in accordance with an embodiment of the disclosure.

In an example, IR imaging device 100 may be side-fired (IR imaging device 100 captures images of people from the side), and the average pixel intensities of images captured by IR imaging device 100 may be used to count a number of people as shown in FIG. 6. As shown in FIG. 6, each time a person moves within the FOV of IR imaging device 100, the average pixel intensities (or pixel value differences from the baseline value) represented by the y-axis peaks and dissipates as the person moves out of the FOV. Because each person has an approximately similar pixel volume or a pixel volume within a predetermined pixel volume range in the captured image, the average pixel intensity may be proportional to the number of people in the FOV. Accordingly, the average pixel intensity (e.g., a sum of the average row intensities) may be used to determine a number of people in the FOV of IR imaging device 100. The average pixel intensities will be at or close to the baseline pixel value (e.g. zero) when there are no people within the FOV.

Figure 7:
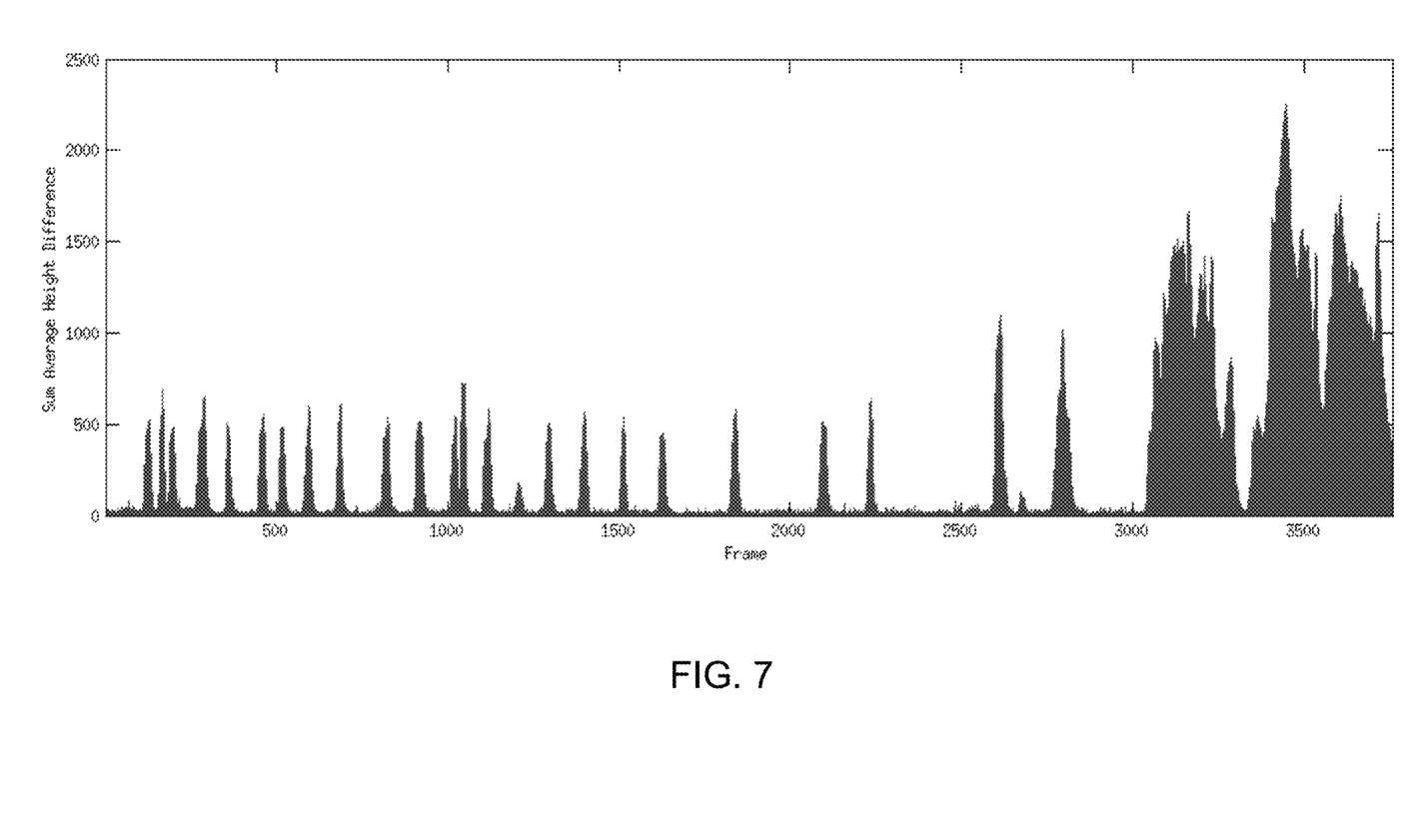
FIG. 7 illustrates a graph of average pixel intensity of images captured using an overhead IR imaging device in accordance with an embodiment of the disclosure.

In another example, IR imaging device 100 may be overhead (IR imaging devices 100 captures images of people from above), and the average pixel intensities of images captured by IR imaging device 100 may be used to count a number of people as shown in FIG. 7. As shown in FIG. 7, the average pixel intensities represented by the y-axis are higher when there are people in the FOV of IR imaging device. The average pixel intensity may be proportional to the number of people in the FOV. Accordingly, the average pixel intensity (e.g., a sum of average pixel value differences from the baseline values) may be used to determine a number of people in the FOV of IR imaging device 100.

Figure 8:
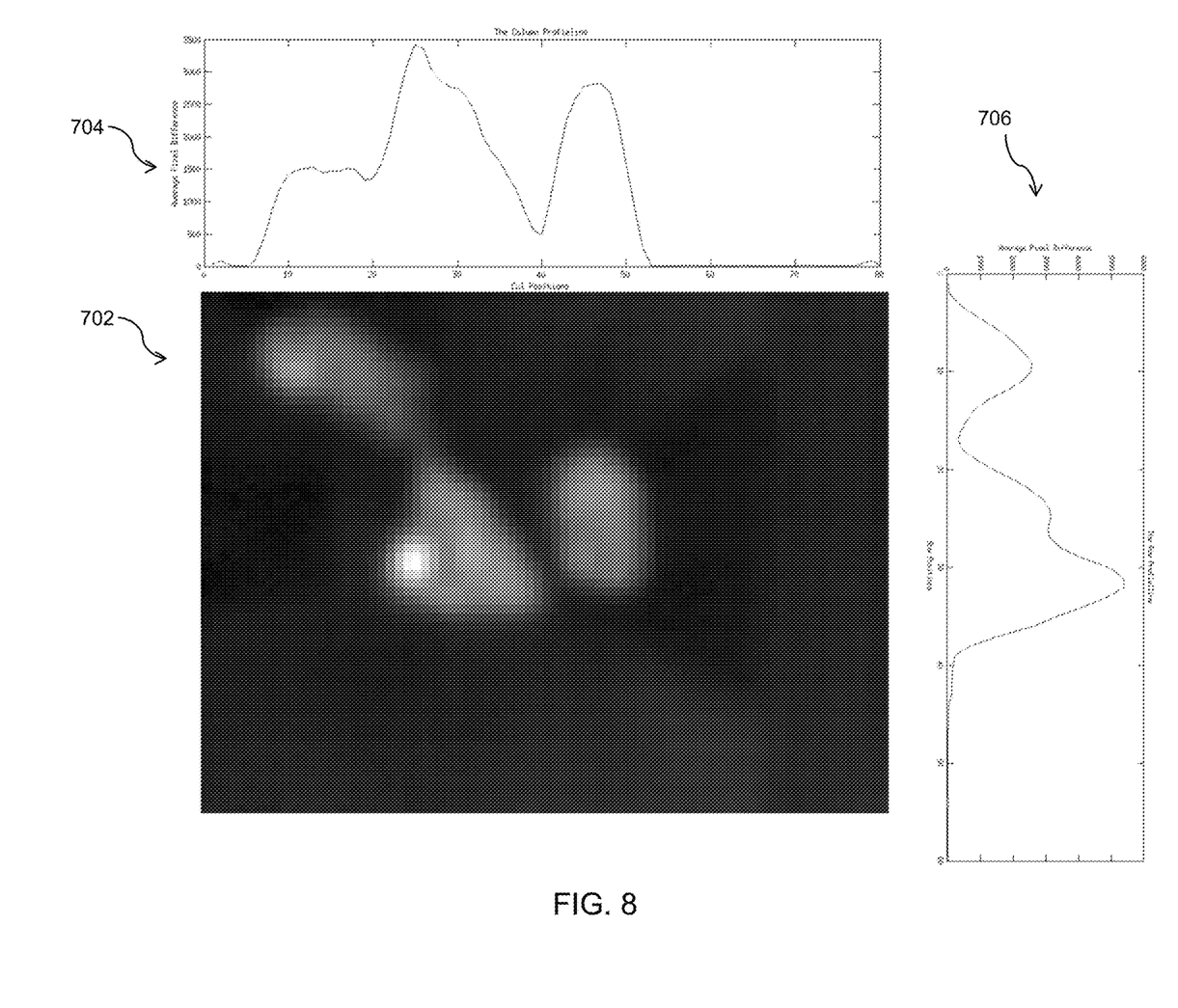
FIG. 8 illustrates an image captured using an overhead IR imaging device and graphs of average pixel intensities of the captured image in accordance with an embodiment of the disclosure.

In a further example, IR imaging device 100 may be overhead (IR imaging devices 100 captures images of people from above), and IR imaging device 100 may capture an image of one or more people as shown in an image 702 in FIG. 8. A horizontal profile 702 such as column profile may be determined from image 704. Horizontal profile 702 shows horizontal location (e.g., column position) represented by the x-axis vs. average pixel intensity represented by the y-axis. Further, a vertical profile 706 such as row profile may be determined from image 702. Vertical profile 706 shows vertical location (e.g., row position) represented by the x-axis vs. average pixel intensity represented by the y-axis. IR imaging device 100 may combine horizontal profile 704 and vertical profile 706 to perform spatial two-dimensional segmentation and foreground detection. Accordingly, the average pixel intensities may advantageously be used to separate objects from each other. As can be observed in the two profile lines of horizontal profile 704 and vertical profile 706, objects may be separated from each other based on the local minimums. IR imaging device 100 may further take into account the expected volume of each person given the perspective of IR imaging device 100 (e.g., side-fired, overhead, at a certain angle from above, etc.).

At block 410, IR imaging device 100 may determine whether an object in foreground 144 is detected at block 406 (e.g., presence of a foreground object). Additionally, or alternatively, IR imaging device 100 may determine whether a classified object in foreground 144 is detected at block 408 (e.g., the presence of a human, human activity, or human motion).

At block 412, if a foreground (e.g., a human) is detected at block 410, the update of the applied background calibration terms is slowed down. If no human is detected for a predetermined time period (e.g., no human activity or motion for 1 minute), IR imaging module 102 may capture an image of background 142, acquire updated background calibration terms, and update the background calibration terms. Processor 120 may control or modulate when logic device 110 acquires and updates background calibration terms. Accordingly, the background calibration terms are updated using a feedback mechanism that includes slowing down the update when people are detected and performing the update if no people are detected for a predetermined time period. The feedback mechanism used for updating of the calibration terms may be referred to as temporal foreground detection and, thus, IR imaging device 100 combines spatial foreground detection discussed above with temporal foreground detection.

In some embodiments, if human activity is detected at block 410, the update of the background calibration terms is slowed down only for pixels that are a part of the object segment determined to indicate a human. In this manner, update of background calibration terms may be adaptive—some pixels are updated faster. Background calibration terms for some pixels are acquired and updated while background calibration terms for pixels that are or were recently a part of an object segment determined to indicate a human is not updated. In further embodiments, such adaptive updating of background calibration terms may only occur when the object segment is determined to indicate a human with a confidence level that is above a threshold confidence level.

Although blocks 408-412 have been described in relation to detecting people, other objects of interest and moving objects may be detected in other embodiments. In further embodiments, blocks 408-412 may also perform fire detection.

At block 414, IR imaging device 100 generates or updates a heat map (e.g., a map or other data structure for presenting information associated with objects in a scene). Processor 120 of IR imaging device 100 may generate a heat map using the output image data from ROIC 114 at block 404, segmented objects at block 406, and/or classified objects at block 408. Processor 120 may display the heat map on a display such as display 124 (shown in FIG. 3).

Various features may be shown on the heat map. The object segments and classification from blocks 406-408 may be shown on the heat map. When an object in scene 140 moves, an object segment corresponding to the object may move on the heat map when the heat map is updated. Advantageously, recognizing high pixel values of pixels or pixel areas of an image may replace complex tracking algorithms typically used for object tracking processes.

Features shown on the heat map may include features in real-time or near real-time such as where people are located, where people are facing, what people are looking at, how many people are present, or other feature at the moment. Features shown on the heat map may include features determined over a period of time such as where people tend to walk through, where people spend more time, what people tend look at, or other feature based on trends. In some embodiments, the heat map may utilize horizontal profile 704 and vertical profile 706 shown in FIG. 7 to determine one or more features shown on the heat map. In an example, IR imaging device 100 may advantageously be used at a retail location to provide information such as where customers are located, where customers are moving within the store, where they are looking at, the most common trajectories of the customers, and other useful information.

A shutterless IR imaging device such as IR imaging device 100 that applies background calibration terms, which are based on IR radiation received from an empty scene, advantageously provides a stable image for extraction and segmentation in blocks 406-408. The process described above in relation to FIG. 4 not only produces more accurate segmentation but also produces less ghost artifacts. Further, there may be a longer mean time between failures (MTBF) compared to IR imaging devices that use a shutter for FFC, since the shutter and related mechanical components are not needed in one or more embodiments of the disclosure. In addition, further advantages of more accurate, efficient, and otherwise improved foreground extraction and segmentation may be achieved as discussed above for embodiments that utilize a higher bit-depth image, such as a 14-bit image provided without further compression, automatic gain control (AGC), or other mapping to a lower bit-depth image. Since the often complex AGC and/or other compression/mapping processes need not be performed in such embodiments, even further saving of the processing power may be achieved for a processor such as processor 120.

In some embodiments, IR imaging device 100 may also perform one or more processes described at blocks 402-414 using visible light imaging module 108. Such object detection process using visible light imaging module 108 may be combined or otherwise mixed with the object detection and heat map generation process performed using IR imaging module 102. For example, IR imaging device 100 may generate a heat map that includes information from thermal image captured by IR imaging module 102 and visible light image captured by visible light imaging module 108. By utilizing more than one imaging module, fewer artifacts may be included in the foreground pixels and the foreground pixels may be segmented more accurately, which in turn allows for more accurate classification of the segments.

Figure 5:
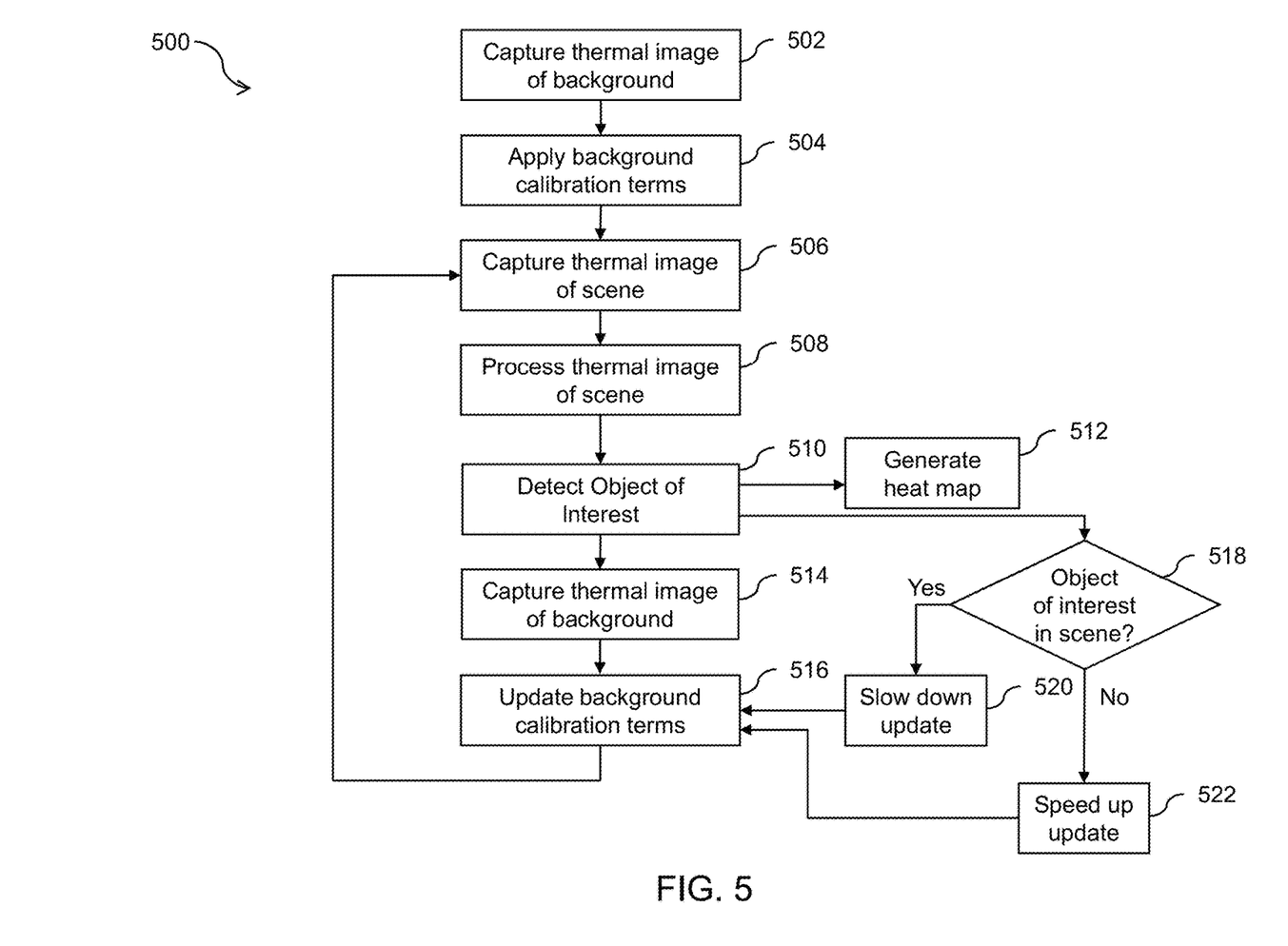
FIG. 5 illustrates another flow diagram of a process to generate a heat map and detect objects in accordance with an embodiment of the disclosure.

FIG. 5 illustrates another flow diagram of a process 500 to generate a heat map and detect objects in accordance with an embodiment of the disclosure. At block 502, IR imaging module 102 of IR imaging device 100 (shown in FIG. 3) captures a thermal image of an empty scene, such as scene 140 that includes background 142 but no foreground 144 (shown in FIG. 3).

At block 504, IR imaging device 100 (e.g., using logic device 110 shown in FIG. 3) acquires background calibration terms based on the thermal image of background 142 in response to IR radiation received from background 142. IR imaging device 100 may store the background calibration terms in a memory, such as memory 112 (shown in FIG. 3). IR imaging device 100 may apply the background calibration terms to IR imaging module 102. Alternatively, or additionally, IR imaging module 102 may apply the background calibration terms to an input image received from IR imaging module 102 at block 506.

The background calibration terms may include gain terms and offset terms for each IR detector of FPA 104 corresponding to a value of a pixel in the thermal image. The background calibration terms for each pixel may bring the value of each pixel to a baseline value (e.g., zero) such that when the background calibration terms are applied, a thermal image captured by IR imaging module 102 in response to IR radiation from the same background 142 will include pixels all having the baseline pixel value (e.g., zero) or low values close to the baseline value (e.g., approximately zero).

At block 506, IR imaging module 102 captures a thermal image of a scene, such as scene 140 including background 142 and foreground 144. Foreground 144 may include various objects that were not present in scene 140 when background 142 was captured at block 502. The various objects may include one or more objects of interest. The objects of interest may be people, animals, moving objects, automobiles, fire, or other objects of interest to an operator. For example, for IR imaging device 100 used at a retail location, the objects of interest may be customers. The operator may be interested in how they are moving within the store, how they are moving, and where they are looking at.

At block 508, IR imaging device 100 (e.g., using processor 120 shown in FIG. 3) processes the thermal image of scene 140 captured at block 506. IR imaging device 100 may determine foreground pixels in the thermal image of scene 140, for example, by detecting foreground as further described above in relation to block 404 in FIG. 4. IR imaging device 100 may determine segments (e.g., segment objects) based on the foreground pixels, for example, by creating the segments as further described above in relation to block 406 in FIG. 4.

At block 510, IR imaging device 100 (e.g., using processor 120) detects one or more objects of interest indicated by at least one of the segments or determine that no objects of interest are in the thermal image of scene 140. For example, IR imaging device 100 may perform the detection by classifying the segments as further described above in relation to block 408 in FIG. 4.

At block 512, IR imaging device 100 (e.g., using processor 120) generates a heat map, as further described in relation to block 412 in FIG. 4. The heat map may indicate where the one or more people are located, walking to, and/or looking at based on the thermal image of scene 140. The heat map may be in grayscale, as shown in FIG. 2, or in color. In certain embodiments, the heat map may be combined or mixed with a visible image captured using visible light imaging module 108 to provide more information to an operator.

In an example, IR imaging device 100 is used at a retail location, and generates a heat map that indicate where customers are located, where customers are moving within the store, where they are looking at. The heat map may further indicate the most common trajectories of the customers.

At block 514, IR imaging module 102 captures a thermal image of an empty scene such as background 142 after a time interval, which may be a predetermined time period. At block 516, IR imaging device 100 (e.g., using logic device 110 and/or processor 120) updates the background calibration terms after the time interval, for example, by acquiring and applying updated background calibration terms based on the thermal image captured at block 514.

At block 518, IR imaging device 100 (e.g., using processor 120) determines whether one or more objects of interest are in scene 140 based on the process at block 510. In some embodiments, IR imaging device 100 updates the background calibration terms only when no objects of interest are detected during the time interval.

At block 520, if it is determined that there are one or more objects of interest in scene 140 at block 518, IR imaging device 100 (e.g., using logic device 110 and/or processor 120) slows down the update process at block 516, such as by increasing the time interval at blocks 514-516. In some embodiments, IR imaging device 100 applies the increased time interval only to select pixels that are a part of the segments determined to indicate an object of interest. IR imaging device 100 may update the background calibration terms corresponding to the select pixels (e.g., background calibration terms for IR detectors corresponding to the select pixels) according to the increased time interval. IR imaging device 100 may update the background calibration terms corresponding to the rest of the pixels (e.g., background calibration terms for IR detectors corresponding to the rest of the pixels) according to a previous time interval or a default time interval. At block 522, if it is determined that there are no objects of interest in scene 140 at block 518, IR imaging device 100 (e.g., using logic device 110 and/or processor 120) speeds up the update process at block 516, such as by decreasing the time interval at blocks 514-516.

Where applicable, the various described embodiments may be implemented using hardware, software, or combinations of hardware and software. Also where applicable, the various hardware components and/or software components set forth herein may be combined into composite components including software, hardware, and/or both without departing from the spirit of the disclosure. Where applicable, the various hardware components and/or software components set forth herein may be separated into sub-components including software, hardware, or both without departing from the spirit of the disclosure. In addition, where applicable, it is contemplated that software components may be implemented as hardware components, and vice-versa. In some embodiments, such hardware components (e.g., processing and control block 118) may be implemented as one or more appropriate processors and/or processing devices (e.g., logic device, microcontroller, processor, application specific integrated circuit (ASIC), field programmable gate array (FPGA), or other device) that may be used to execute appropriate instructions, such as software instructions implementing any of the processes described herein.

Software in accordance with the various described embodiments, such as program code and/or data, may be stored on one or more machine readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

We claim:

1. A device, comprising:
an infrared (IR) imaging module configured to capture thermal images;
a memory configured to store background calibration terms; and
a signal processing device configured to:
receive a thermal image of a background from the IR imaging module;
determine the background calibration terms based on the thermal image of the background, wherein the background calibration terms bring each pixel value of the thermal image of the background to a baseline pixel value;
apply the background calibration terms, wherein the IR imaging module is configured to provide a thermal image of a scene comprising the baseline pixel value for pixels corresponding to the background and pixel values different from the baseline pixel value for pixels corresponding to a foreground according to the applied background calibration terms;
receive additional thermal images of the background from the IR imaging module;
update the background calibration terms periodically according to a time interval based on the additional thermal images;
determine foreground pixels in the thermal image of the scene;
determine segments based on the foreground pixels;
detect one or more objects of interest indicated by at least one of the segments; and
in response to detecting the one or more objects of interest, increase the time interval for at least some of the pixels.

2. The device of claim 1, wherein the processor is configured to update the background calibration terms in response to detecting no objects of interest during the time interval.

3. The device of claim 1, wherein the increased time interval is applied only to select pixels that are a part of the at least one of the segments, and wherein the processor is configured to update the background calibration terms corresponding to the select pixels according to the increased time interval.

4. The device of claim 1, wherein the one or more objects of interest comprise one or more people, and wherein the processor is configured to detect the one or more people based on a volume of the at least one of the segments, an average pixel intensity, or both.

5. The device of claim 4, wherein the processor is further configured to generate a heat map indicating where the one or more people are located, walking to, and/or looking at based on the thermal image of the scene.

6. The device of claim 1, wherein the signal processing device is configured to apply the background calibration terms to a readout integrated circuit of the IR imaging module, to the thermal image of the scene, or both.

7. The device of claim 1, wherein the background calibration terms comprise gain terms and/or offset terms.

8. The device of claim 1, wherein the IR imaging module is a 14-bit shutterless IR imaging module configured to capture 14-bit thermal images.

9. A method comprising:
capturing a thermal image of a background;
acquiring background calibration terms based on the thermal image of the background, wherein the background calibration terms bring each pixel value of the thermal image of the background to a baseline pixel value;
applying the background calibration terms;
capturing a thermal image of a scene comprising the baseline pixel value for pixels corresponding to the background and pixel values different from the baseline pixel value for pixels corresponding to a foreground;
capturing additional thermal images of the background;
updating the background calibration terms periodically according to a time interval based on the additional thermal images;
determining foreground pixels in the thermal image of the scene;
determining segments based on the foreground pixels;

detecting one or more objects of interest indicated by at least one of the segments; and in response to the detecting, increasing the time interval for at least some of the pixels.

10. The method of claim 9, wherein the updating is in response to detecting no objects of interest during the time interval.

11. The method of claim 9, wherein the increasing of the time interval is applied only to select pixels that are a part of the at least one of the segments, and wherein the updating comprises updating the background calibration terms corresponding to the select pixels according to the increased time interval.

12. The method of claim 9, wherein the one or more objects of interest comprise one or more people, and wherein the detecting of the one or more people is based on a volume of the at least one of the segments, an average pixel intensity, or both.

13. The method of claim 12, further comprising generating a heat map indicating where the one or more people are located, walking to, and/or looking at based on the thermal image of the scene.

14. The method of claim 9, wherein the applying comprises applying the background calibration terms to a readout integrated circuit, to the thermal image of the scene, or both.

15. The method of claim 9, wherein the applying comprises applying gain terms and/or offset terms.

16. The method of claim 9, wherein the thermal image of the background and the thermal image of the scene are 14-bit thermal images.

\* \* \* \* \*